United States Patent [19]

Biamonte et al.

[11] Patent Number: 5,454,850
[45] Date of Patent: Oct. 3, 1995

[54] CALCIUM PHOSPHATE AND UREA PHOSPHATE SOLUBLE COMPOUND FERTILIZER COMPOSITIONS

[75] Inventors: Richard L. Biamonte; Robert B. Peters, both of Allentown, Pa.

[73] Assignee: OMS Investments, Inc., Wilmington, Del.

[21] Appl. No.: 167,677

[22] Filed: Dec. 15, 1993

Related U.S. Application Data

[63] Continuation-in-part of Ser. No. 989,398, Dec. 11, 1992, abandoned, and a continuation-in-part of Ser. No. 990,333, Dec. 11, 1992, Pat. No. 5,395,418, which is a continuation of Ser. No. 690,099, Apr. 23, 1991, Pat. No. 5,171,349, which is a continuation-in-part of Ser. No. 648,644, Jan. 31, 1991, abandoned.

[51] Int. Cl.$^6$ ........................................ C05C 9/00
[52] U.S. Cl. .................... 71/29; 71/30; 71/64.1
[58] Field of Search ...................... 71/28–30, 64.08, 71/64.1

[56] References Cited

U.S. PATENT DOCUMENTS 5,171,349  12/1992  Vetonovetz et al. ................ 71/29
5,395,418  3/1995  Vetanovetz ........................ 71/29

FOREIGN PATENT DOCUMENTS 2072644  10/1981  United Kingdom .................. 71/29

OTHER PUBLICATIONS

Grandapan Maxima Product Label and Export Certificate (No Date).
Grandapan Sublima Product Label and Export Certificate (No Date).

*Primary Examiner*—Ferris Lander
*Attorney, Agent, or Firm*—Jones, Day, Reavis & Pogue

[57] ABSTRACT

A precipitate free concentrated aqueous stock solution formed from a dry solid fertilizer mixture and containing from about 0.1% to 50% by weight of dissolved solid fertilizer. The stock solution contains phosphorus and calcium and is prepared by bringing together the dry fertilizer mixture and water to make up a concentrated stock solution. The dry solid fertilizer mixture comprises 1% to 95% by weight of dry urea phosphate as the principal phosphorus source and 0.2% to 70% by weight of dry calcium phosphate in the form of monocalcium phosphate, dicalcium phosphate, tricalcium phosphate and mixtures thereof to contribute a desired amount of phosphorus and calcium for fertilization purposes.

22 Claims, No Drawings

CALCIUM PHOSPHATE AND UREA PHOSPHATE SOLUBLE COMPOUND FERTILIZER COMPOSITIONS

This application is a continuation-in-part of application Ser. No. 07/989,398 filed Dec. 11, 1992, entitled Solubility Compound Fertilizer Compositions now abandoned, and application Ser. No. 07/990,333, filed Dec. 11, 1992, entitled Solubility Compound Fertilizer Compositions now U.S. Pat. No. 5,395,418, Mar. 7,1995, which are continuations of application Ser. No. 690,099, filed Apr. 23, 1991, now U.S. Pat. No. 5,171,349, entitled Solubility Compound Fertilizer Compositions, which is a continuation-in-part of application Ser. No. 648,644, filed Jan. 31, 1991, abandoned.

BACKGROUND OF THE INVENTION

1. Field of the Invention

This invention concerns the enhanced solubility of calcium phosphate fertilizer compositions and in particular calcium phosphate compositions useful for preparing aqueous fertilizer solution for precision plant nutrition.

2. Prior Art

In greenhouses, nurseries, and other intensive horticulture environments, best results are attained when macro- and micro-nutrients are carefully delivered to the growing plants. Many growers choose to utilize compound high analysis water soluble fertilizers. Typically, these fertilizers are marketed as solids which are dissolved to prepare concentrated stock solutions which are then diluted into irrigation water by means of proportioners or injection devices.

The Grace-Sierra Horticultural Products Company markets a wide range of water-soluble solid compound fertilizer formulations under the trademark Peters Professional. These formulations are designed to dissolve quickly and completely with no precipitation. It is also desired that a fertilizer formulation have good long term stability as a stock solution so as not to form precipitates which clog proportioners and irrigation lines in used by commercial growers. This has led to a limitation with water soluble fertilizer formulation available heretofore.

Calcium is an important nutrient which is called for in many plant nutrition formulations, but calcium salts cannot be used together with the conventional phosphorus sources-monoammonium phosphate and diammonium phosphate. As the pH's which these phosphate sources provide are to high (not acid enough) to give adequate solubility to the calcium ions and thus give rise to precipitation of the calcium salts in the stock solution and in the proportioners. Potassium phosphate or sodium phosphate can be used as soluble phosphorus sources but these are either expensive or not conducive to plant growth. Phosphoric acid can be used but is a liquid and hazardous to handle. Therefore, a grower wishing to fertilize with both calcium and phosphorus, without resorting to the use of an alkali metal phosphate or liquid phosphorus acid, will need to inject these two elements separately.

An alternative covered under U.S. Pat. No. 5,171,349, which is assigned to the same assignee as that of the present invention, and whose entire disclosure is incorporated by reference herein, is to utilize fertilizers which include urea phosphate as the sole phosphate source in order to maintain solubility of calcium such as calcium nitrate or calcium chloride. The low solubility of calcium phosphate either as monocalcium phosphate, dicalcium phosphate or tricalcium phosphate in aqueous solutions has precluded its use in providing adequate levels of calcium and phosphate. These materials are generally utilized as conditioning agents to reduce caking in fertilizer and food related compounds such as table salt.

In U.K. Patent No. 2,072,644 (Wolstein et al.) a procedure is disclosed for producing a nitrogenous fertilizer by heating in the range of 100° to 130° C. The process utilizes urea and phosphoric acid or urea phosphate or a mixture thereof added to a fertilizer feedstock comprising calcium nitrate.

The present invention is much simpler and does not require the addition of heat as in Wolstein.

The present invention teaches that solubility is attained with a mixture of calcium phosphate whether in the form of monocalcium phosphate, dicalcium phosphate and/or tricalcium phosphate with urea phosphate to form an aqueous solution.

The present invention employs urea phosphate in water soluble solid fertilizer formulations. Urea phosphate is a known material. The text, urea and phosphate fertilizers by Clifford W. Fowler (Noyes Data Corporation, Park Ridge, N.J. 1976) at page 23, shows a process for preparing this material and suggests that it may be used as a fertilizer. Similarly, U.S. Pat. No. 4,456,463 discloses the use of urea phosphoric acid reaction products as ammonia stabilized liquid components of fertilizer. Chemical abstracts 106(3) 101311Q shows a liquid component for use in fertilizers which contains a urea phosphate poly-condensation product. Chemical abstracts 102(9) 7748V also shows this.

Other references of interest include chemical abstracts 101(23) 209498S which concerns the biological fate of urea/phosphate fertilizers; chemical abstracts 101(21) 190398K which describes the use of urea phosphate fertilizers; chemical abstracts 88(19) 135558a which describes the reaction of that phosphoric acid reacts with urea and calcium salts; and chemical abstracts 86(11) 7073g which deals with the development of liquid multi-component fertilizers based on potassium and ammonium nitrates and diphosphate, urea, water and trace elements.

SUMMARY OF THE INVENTION

An improved solid fertilizer which dissolves calcium and phosphate completely in water to give a phosphorus and calcium containing stock solution. This fertilizer is characterized by being a solid, by having urea phosphate and calcium phosphate in the form of monocalcium phosphate, dicalcium phosphate, tricalcium phosphate and mixtures thereof, and by creating an aqueous concentrated precipitate-free stock solution initially or upon prolonged standing, such as for 24 hours or longer.

The invention provides a calcium containing solid complex fertilizer which dissolves completely in water to give a water-based precipitate-free stable aqueous stock solution, this solid fertilizer containing solid urea phosphate as the principal phosphorus source and calcium phosphate in the form of monocalcium phosphate, dicalcium phosphate, tricalcium phosphate and mixtures thereof with or without calcium nitrate.

In addition, this invention provides a method for preparing a stable water-based phosphorus containing and calcium containing fertilizer aqueous stock solution. This method involves obtaining a solid compound fertilizer admixture of urea phosphate as a primary phosphorus component and calcium phosphate in the form of monocalcium phosphate, dicalcium phosphate, tricalcium phosphate and mixtures thereof as a secondary phosphorus component and primary calcium component. This dry admixture is mixed with water at a ratio predetermined to yield to a concentration of the admixture of 0.1% to 50%, or 5.1 to 50%, by weight and the admixture is allowed to dissolve completely.

The inclusion of urea phosphate in a dry blended mixture which includes calcium phosphate or calcium chloride (or which may include calcium chloride or calcium nitrate or both) offers several advantages. For one, the urea phosphate establishes a low pH condition when the blended mixture is added to water to make a concentrated solution. A stock solution in the range of 0 to 2 pH may be achieved. This low solution pH maintains solubility and clarity of the concentrated stock solution. By the effect urea phosphate has on solution pH, it maintains solubility of calcium phosphate. In summary, (1) calcium phosphate can be used to make a concentrated precipitate-free solution provided that urea phosphate is the primary phosphate source in the admixture, (2) calcium phosphate can be used as a secondary phosphorus source, (3) calcium phosphate is included as a conditioner in compounds such as calcium nitrate and can be solubilized with urea phosphate.

DETAILED DESCRIPTION OF THE INVENTION

The fertilizer compositions of this invention are dry solid materials. This is defined to mean that they are particulate flowing solids having a water content of less than about 10% by weight total composition.

The fertilizer compositions of this invention contain urea phosphate as a dry particulate solid,

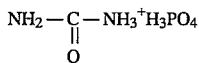

This amount of urea phosphate will vary depending upon the nitrogen and phosphorus analysis desired for the formulation composition, since urea phosphate contributes nitrogen as well. As phosphorus in a precise stoichiometric ratio to the dry fertilizer mix, it may be necessary to add additional nitrogen sources to alter the ratio provided by urea phosphate alone. A solid product of the invention will contain at least about 1% by weight (total solids) of urea phosphate which by itself will contribute about 0.5% with phosphorus, (calculated as $P_2O_5$) and about 0.5% with nitrogen as N. The solid product can contain up to about 95% by weight of urea phosphate which would by itself contribute about 43% phosphorus as $P_2O_5$ and about 17% nitrogen as N. The solid product would also contain at least about 0.2% calcium phosphate, which by itself will contribute about 11% phosphorus (calculated as $P_2O_5$) and about 0 03% calcium the solid product would contain up to about 70% by weight of calcium phosphate which would by itself contribute 38.7% phosphorus as $P_2O_5$ and about 11% of calcium.

These material are mixed as solids. The resulting products are dry solids as that term has been defined herein. They can be solid in bulk or they can be remeasured into units suitable for forming a standard volume of stock solution. In either case, it is often of advantage to distribute the materials in water-resistant packaging to minimize caking and lumping. Similarly, it may be of advantage to include soluble inerts which are dyes, or which promote dispersion, prevent caking or the like.

The solid products of this invention are made up into stock solutions by dissolving in water. This should be carried out in clean equipment usually with some agitation. Commonly, the stock solution contains from about 0.05 to about 5 lbs/gallon of dissolved solid (that is, from about 2% to about 40% by weight of dissolved solid). Preferably the stock solution contains from about 5.1% to about 35% by weight of dissolved solid. This stock solution material is diluted by a factor of from 10 to 200 for application to the plants. This gives final concentrations which, for nitrogen, range from about 25 ppm up to about 450 ppm, with the other nutrients scaled accordingly.

In addition, if desired, calcium chloride, calcium nitrate, or both may be added to the dry mix in varying amounts depending upon the circumstances of use.

The materials of this invention will be further described with reference to the following examples shown in Table 1 hereto. These are provided to illustrate the practice of the invention and not to limit its scope. The results show that urea phosphate is capable of solubilizing mono, di and tri calcium phosphate. Monocalcium phosphate provides a more soluble admixture with urea phosphate as compared with di and tri calcium phosphate. These results show that one can provide solid compound fertilizers which can be successfully formed into stable stock solutions having weight compositions as follows:

CALCIUM/PHOSPHORUS COMPOUND FERTILIZER

Calcium Phosphate 0.1 to 50%
Urea Phosphate 0.1 to 50%

Without further elaboration the foregoing will so fully illustrate our invention that others may, by applying current or future knowledge, adapt the same for use under various conditions of service.

TABLE 1

| INFLUENCE OF UREA PHOSPHATE (UP) ON THE SOLUBILITY OF MONOCALCIUM PHOSPHATE (MCP), DICALCIUM PHOSPHATE (DCP) AND TRICALCIUM PHOSPHATE (ICP) | |
|---|---|
| SOLUBLE | NON SOLUBLE |
| | 0 Gr UP + 1 Gr MCP/L |
| 28 Gr UP + 1 Gr MCP/L | |
| 28 Gr UP + 2 Gr MCP/L | |
| 28 Gr UP + 3 Gr MCP/L | |
| 28 Gr UP + 4 Gr MCP/L | |
| 28 Gr UP + 5 Gr MCP/L | |
| 28 Gr UP + 6 Gr MCP/L | |
| 28 Gr UP + 7 Gr MCP/L | |
| 28 Gr UP + 8 Gr MCP/L | |
| 28 Gr UP + 9 Gr MCP/L | |
| 28 Gr UP + 10 Gr MCP/L | |
| 28 Gr UP + 11 Gr MCP/L | |
| 28 Gr UP + 12 Gr MCP/L | |
| 28 Gr UP + 13 Gr MCP/L | |
| | 28 Gr UP + 56 Gr MCP/L |
| | 0 Gr UP + 1 Gr DCP/L |
| 28 Gr UP + 1 Gr DCP/L | |
| 28 Gr UP + 2 Gr DCP/L | |
| 28 Gr UP + 3 Gr DCP/L | |
| 28 Gr UP + 4 Gr DCP/L | |
| 28 Gr UP + 5 Gr DCP/L | |
| 28 Gr UP + 6 Gr DCP/L | |
| 28 Gr UP + 7 Gr DCP/L | |
| 28 Gr UP + 8 Gr DCP/L | |
| 28 Gr UP + 9 Gr DCP/L | |
| 28 Gr UP + 10 Gr DCP/L | |
| 28 Gr UP + 11 Gr DCP/L | |
| 28 Gr UP + 12 Gr DCP/L | |

TABLE 1-continued

INFLUENCE OF UREA PHOSPHATE (UP)
ON THE SOLUBILITY OF
MONOCALCIUM PHOSPHATE (MCP),
DICALCIUM PHOSPHATE (DCP) AND
TRICALCIUM PHOSPHATE (ICP)

| SOLUBLE | NON SOLUBLE |
|---|---|
|  | 28 Gr UP + 42 Gr DCP/L |
|  | 0 Gr UP + 1 Gr TCP/L |
| 28 Gr UP + 1 Gr TCP/L |  |
| 28 Gr UP + 2 Gr TCP/L |  |
| 28 Gr UP + 3 Gr TCP/L |  |
| 28 Gr UP + 4 Gr TCP/L |  |
| 28 Gr UP + 5 Gr TCP/L |  |
| 28 Gr UP + 6 Gr TCP/L |  |
| 28 Gr UP + 7 Gr TCP/L |  |
| 28 Gr UP + 8 Gr TCP/L |  |
|  | 28 Gr UP + 9 Gr TCP/L |

We claim:

1. A precipitate free concentrated aqueous stock solution formed from a dry solid fertilizer mixture and containing from about 0.1% to 50% by weight of dissolved solid fertilizer, the stock solution containing phosphorus and calcium, the stock solution being prepared by bringing together the dry fertilizer mixture and water to make up a concentrated stock solution, the dry solid fertilizer mixture comprising 1% to 95% by weight of dry urea phosphate as the principal phosphorus source and 0.2% to 70% by weight of dry calcium phosphate to contribute a desired amount of phosphorus and calcium for fertilization purposes.

2. The stock solution of claim 1 additionally including at least one non-chelated trace metal salt selected from the group consisting of iron, magnesium, manganese, copper and zinc sulfates, chlorides, or nitrates and mixtures thereof.

3. The solution of claim 2 wherein the non-chelated trace metal salt is present in an amount of up to 50% of the total fertilizer.

4. The stock solution of claim 1 additionally including a trace metal salt in a chelated form selected from the group consisting of iron EDTA, iron DTPA, iron lignosulfonate, manganese EDTA, copper EDTA, zinc EDTA, manganese lignosulfonate, copper lignosulfonate, zinc lignosulfonate and mixtures thereof.

5. The solution of claim 4 where the chelated metal salt is present in amount of up to 50% by weight of the total fertilizer.

6. The stock solution of claim 1 additionally including a nonchelated magnesium salt selected from the group consisting of magnesium sulfate, magnesium nitrate, magnesium chloride and mixtures thereof.

7. The solution of claim 6 wherein the non-chelated magnesium salt is present in amount up to 50% by weight of the total fertilizer.

8. The stock solution of claim 1 additionally comprising calcium nitrate or calcium chloride.

9. The aqueous stock solution of claim 1 wherein said dry calcium phosphate in said fertilizer mixture is selected from the group consisting of monocalcium phosphate, dicalcium phosphate, tricalcium phosphate and mixtures thereof.

10. A method of making a precipitate free concentrated liquid fertilizer stock solution comprising:

providing a solid admixture comprised of 1% to 95% by weight urea phosphate as the principal phosphorus source and 1% to 95% by weight dry calcium phosphate as the principal calcium source to contribute a desired amount of phosphorous and calcium for fertilization purposes, and dissolving the solid admixture in water to make up a precipitate free concentrated stock solution containing about 2% to about 40% by weight of said admixture.

11. The method of claim 10 additionally comprising including at least one non-chelated trace metal salt in said solid admixture, said non-chelated trace metal salt being selected from the group consisting of iron, magnesium, manganese, copper and zinc sulfates, chlorides, or nitrates and mixtures thereof.

12. The method of claim 11 wherein the non-chelated trace metal salt is present in an amount of up to 50% of the total fertilizer.

13. The method of claim 11 wherein the nonchelated micronutrient trace metal salt comprises ferrous sulfate, ferrous chloride or iron nitrate.

14. The method of claim 13 wherein the nonchelated micronutrient trace metal salt comprises copper sulfate, copper chloride or copper nitrate.

15. The method of claim 11 wherein the nonchelated micronutrient trace metal salt comprises manganese sulfate, manganese chloride or manganese nitrate.

16. The method of claim 11 wherein the nonchelated micronutrient trace metal salt comprises zinc sulfate, zinc chloride or zinc nitrate.

17. The method of claim 10 additionally comprising including a trace metal salt in a chelated form in said solid admixture, said chelated trace metal salt being selected from the group consisting of iron EDTA, iron DTPA, iron lignosulfonate, manganese EDTA, copper EDTA, zinc EDTA, manganese lignosulfonate, copper lignosulfonate, zinc lignosulfonate and mixtures thereof.

18. The method of claim 17 wherein the chelated metal salt is present in an amount of up to 50% by weight of the total fertilizer.

19. The method of claim 10 additionally comprising including a non-chelated magnesium salt in said solid admixture, said non-chelated magnesium salt being selected from the group consisting of magnesium sulfate, magnesium nitrate, magnesium chloride and mixtures thereof.

20. The method of claim 19 wherein the non-chelated magnesium salt is present in an amount up to 50% by weight of the total fertilizer.

21. The method of claim 10 additionally comprising including calcium nitrate or calcium chloride and a nonchelated trace metal salt in said solid admixture.

22. The method of claim 10 wherein said calcium phosphate in said solid admixture is selected from the group consisting of monocalcium phosphate, dicalcium phosphate, tricalcium phosphate and mixtures thereof.

* * * * *

UNITED STATES PATENT AND TRADEMARK OFFICE
CERTIFICATE OF CORRECTION

PATENT NO. : 5,454,850
DATED : October 3, 1995
INVENTOR(S) : Richard L. Biamonte et al.

It is certified that error appears in the above—identified patent and that said Letters Patent is hereby corrected as shown below:

Column 3, Lines 54-55, change "about 0" to --about 0.03%--.

Signed and Sealed this

Ninth Day of July, 1996

Attest:

BRUCE LEHMAN

Attesting Officer

Commissioner of Patents and Trademarks